Jan. 10, 1939. E. H. SHAFF 2,143,173
ROTARY DRIVING TOOL
Filed March 9, 1935 2 Sheets-Sheet 1
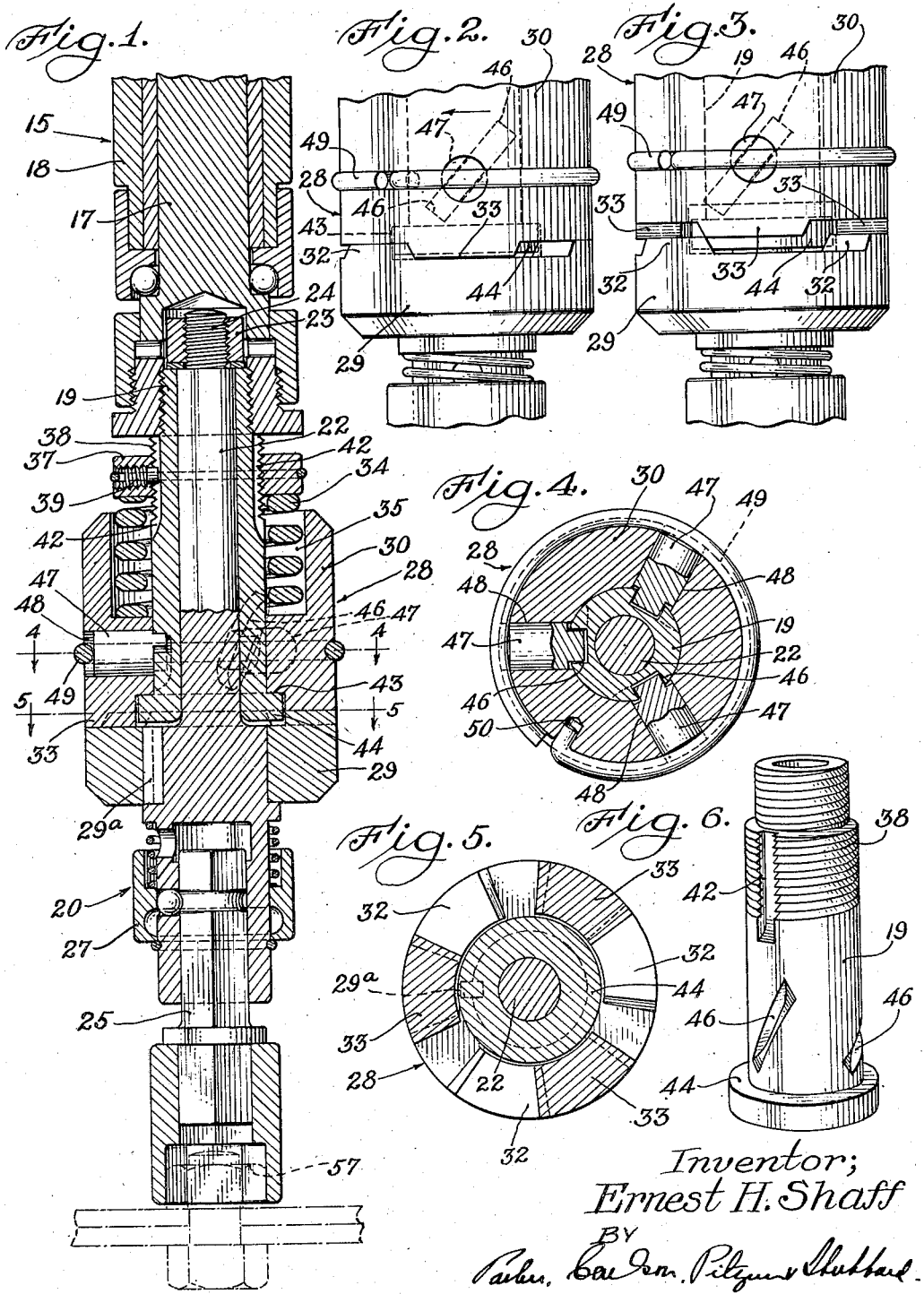
Inventor;
Ernest H. Shaff Jan. 10, 1939.  E. H. SHAFF  2,143,173
ROTARY DRIVING TOOL
Filed March 9, 1935  2 Sheets-Sheet 2
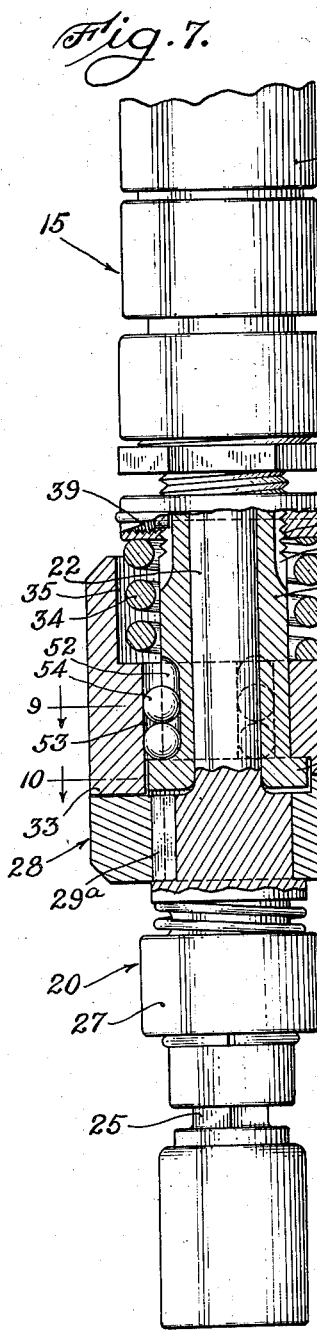
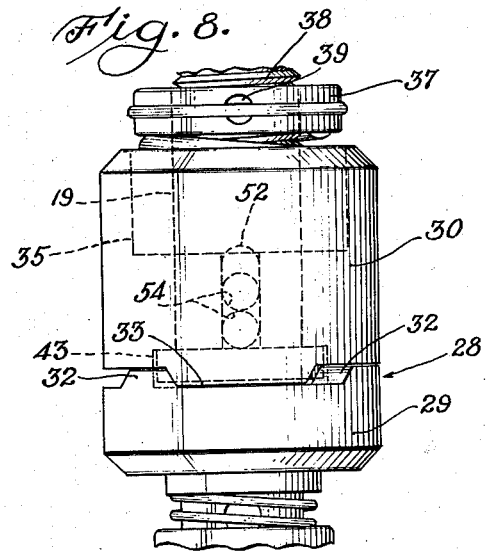
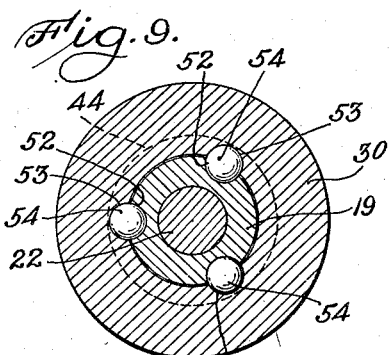
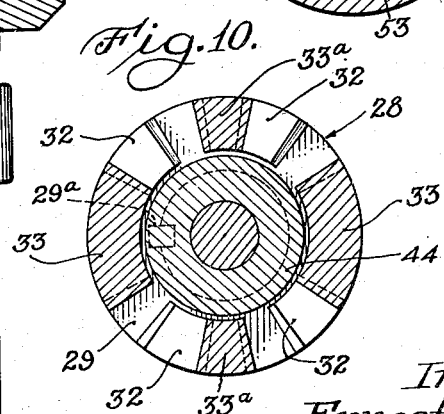
Inventor;
Ernest H. Shaff
BY
Parker, Carlson, Pitzner & Hubbard
Attorneys.

Patented Jan. 10, 1939

2,143,173

UNITED STATES PATENT OFFICE 2,143,173

ROTARY DRIVING TOOL

Ernest H. Shaff, Grand Haven, Mich., assignor to William H. Keller, Inc., Grand Haven, Mich., a corporation of Michigan Application March 9, 1935, Serial No. 10,137

9 Claims. (Cl. 192—30.5)

This invention relates to improvements in power actuated rotary tools particularly adapted for driving and setting binding elements such as threaded nuts, screws or the like.

While the present invention is not limited with respect to the manner in which the tool is powered, it has been found well suited for high-speed pneumatic driving tools which are motivated by a suitable air motor. In pneumatic tools of this character it has heretofore been customary to employ a rigid and unyielding spindle structure for direct power transmission from the motor to the driver, and the air pressure for actuating the motor was calculated to furnish slightly less driving force than the resisting force or torque developed after the threaded element had been set, thus stalling the tool at the completion of each operation. However, such tools have usually been of light weight construction and the sudden halt thus produced resulted in a noticeable recoil against which the operator had to hold the device. For example, where a 20 foot-pound pull or driving force was necessary to tighten a nut, the operator would be required to hold the tool against a jolt delivered with that force at each stall. Manifestly, repeated operations with such a tool would result in great physical strain and fatigue.

The principal object of the present invention, therefore, is to provide a power actuated rotary driving tool including power and tool members normally coupled for joint rotation by a connection releasable when the difference in torque between the members attains a given value, thereby substantially relieving the tool of jerking incident to setting a threaded element Another object is to provide a device of the foregoing character in which as an incident to release of the connection, a series of direct hammering blows is imparted to the tool member by means moving in the direction of the work for tightening the threaded element.

Another object resides in the provision in a driving device of an improved clutch having a fixed clutch element and a driven movable clutch element yieldably urged into driving engagement by adjustable resilient means and arranged for predetermined slippage and non-driving relation when the difference in torque between the connected parts of the device reaches a given value.

Another object resides in the provision of means adapted for releasably coupling the relatively moving parts of a rotary driving tool and embodying complementally arranged opposed elements one of which is movable relative to the other but which is resiliently urged thereagainst and is cooperative with means operable as an incident to release of the connection for guiding the movable element away from the other in a direction substantially along the line of the resultant of the driving and resilient forces upon the movable element, thus minimizing frictional resistance and effecting smooth and uniform movement from one relative position to another.

Another object is to provide a new and improved device of this character embodying a driving connection between a rotary prime mover and a rotatable tool which includes separable clutch means and associated compression means cooperatively related by cam means to impart additional rotative power to the tool as reengagement of the clutch means occurs.

Other objects and advantages will become apparent from the following description taken in connection with the accompanying drawings, in which:

Figure 1 is a transverse sectional view through a device embodying the principles of the invention.

Figs. 2 and 3 are fragmentary elevational views showing the clutch of the device of Fig. 1 in driving and in non-driving relationship, respectively.

Fig. 4 is a sectional view taken substantially along line 4—4 of Fig. 1.

Fig. 5 is a sectional view taken substantially along line 5—5 of Fig. 1.

Fig. 6 is a perspective view of the sleeve forming part of the power member of the tool.

Fig. 7 is an elevational view partly in section of another form of the invention.

Fig. 8 is a fragmentary elevational view of the clutch mechanism of the latter form of the device.

Figs. 9 and 10 are sectional views taken substantially along lines 9—9 and 10—10, respectively, of Fig. 7.

While the invention is susceptible of various modifications and alternative constructions I have shown in the drawings and will herein describe in detail, the preferred embodiments, but it is to be understood that I do not thereby intend to limit the invention to the specific forms disclosed, but intend to cover all modifications and alternative constructions falling within the spirit and scope of the invention as expressed in the appended claims.

In carrying out the present invention, the parts of the device are normally coupled for joint rotation so that the operator need exert no pressure upon the tool during operation, and improved results are attained through mounting the movable member of the clutch upon the power unit, as will presently more fully appear. In common practice heretofore, however, the rotary parts were normally spring-urged apart and the operator was required to exert substantial pressure after applying the tool to the work in order to effect a driving connection. Moreover, the clutch usually consisted of a member rigidly secured to the power unit and engageable with a member mounted yieldably on the tool unit.

By way of illustration, the invention is shown as embodied in a driving tool including a rotary power unit 15 associated with and driven by suitable power means, such as a pneumatic motor (not shown). As seen in Figs. 1 and 7, the power unit includes a shaft 17 rotatable in a suitable casing 18 and having connected fast upon its outer end a member 19 formed as a tubular sleeve. Coaxial with the power member is a tool unit 20 including a member 22 fashioned as a spindle rotatably mounted within the sleeve 19 and held against longitudinal movement relative thereto by a nut 23 secured upon a threaded portion 24 at its inner end. The outer end of the spindle is bored to receive the shank of a tool 25 and is provided with any desired conventional form of releasable tool holder 27.

In order to transmit driving force from the power member to the tool member, I utilize a connection embodying a clutch generally indicated at 28, which has a pair of opposed clutch elements 29 and 30 including complementary interengaging driving teeth 32 and 33, respectively. These teeth, it will be observed, may be formed as circumferentially spaced segments having beveled side faces and flat outer faces. One of the clutch elements, herein the element 29, is secured fast upon the tool member 20 by a spline key 29a; and the second clutch element 30 is slidably mounted about the sleeve 19, being normally forced toward the element 29 by resilient means such as an expansile spring 34. The clutch elements are, therefore, normally operatively engaged and are adapted for relative axial separating movement against the force of the spring.

As herein shown an annular recess 35 is provided in the clutch element 30 for receiving the spring; and the tension of the spring is regulated by an adjustable nut 37, the latter being received upon a threaded portion 38 on the sleeve 19. Any adjusted position of the nut is maintained by a set screw 39 passing radially through the nut and engaging in one of a plurality of spaced longitudinal grooves 42 in the sleeve. A rabbeted groove 43 adjacent the inner edge of the contact face of the clutch element 30 furnishes a seat engageable with an integral annular shoulder 44 formed upon the outer end of the sleeve 19 and serving to limit outward movement of the clutch element under the influence of the spring 34 while the device is being assembled.

In the present instance the clutch element 30 is maintained against all but limited movement relative to the sleeve 19 by a sliding key arrangement. Thus, the sleeve 19 may have milled therein adjacent the clutch a plurality of spaced slots 46 (Figs. 1, 4, and 6) forming ways for receiving the ends of pin keys 47 extending radially through suitable apertures 48 in the clutch element 30. These keys may be removably secured in place by a spring retaining ring 49 seated in a suitable groove and locked against displacement by having one of its ends turned angularly to fit within a shallow bore 50.

Preferably the keyways 46 are diagonally arranged as best seen in Figs. 2, 3, and 6 so that movement of the clutch element 30 will be guided in a limited helical path, herein shown as counterclockwise, relative to the sleeve 19. Where desired, however, straight longitudinal keyways may be employed as seen in Figs. 7 and 8 wherein complementary grooves 52 and 53 are formed in the sleeve 19 and the clutch element 30, respectively, and balls 54 provide frictionless keys. With the latter arrangement only limited longitudinal reciprocation of the clutch element is permitted.

When a threaded element such as a nut 57 is to be driven, the tool is positioned and power applied to the power member 15 which rotates at high speed and through the coupling provided by the clutch 28 similarly rotates the tool member 20 until the nut has been set with given force. Thereupon, the tool member is stalled and the force developed between the beveled faces of the engaged clutch teeth 32, 33 cams the clutch element 30 away from the clutch element 29 until the teeth are out of driving engagement, as shown in Fig. 3. As this action takes place the spring 34 yields to a limited extent and slippage of the flat outer teeth faces permits relative rotary movement of the clutch elements, thus allowing the power unit sleeve 19 to rotate relative to the tool spindle.

As soon as the teeth have moved out of driving engagement, however, the rotary movement of the clutch element 30 carries the teeth 33 slidably over the teeth 32 until the teeth are again forced by the spring 34 into driving engagement. To facilitate this reengagement the spacing between the segmental teeth is substantially greater than the length of the teeth so that even though the clutch element 30 may be rotated at very high speed, the pressure exerted by the spring 34 will positively urge the teeth back into driving engagement. Due to the wide spacing between teeth, the continuous driven rotation of the clutch element 30 and the positive return to driving engagement of the clutch teeth, only the forward beveled faces of the teeth 33 and the trailing faces of the teeth 32 come into contact during this action. Furthermore, since the clutch element 29 is held stationary during this action it serves substantially as an anvil against which the movable element 30 acts as a hammer to deliver a blow or succession of blows axially toward and rotatively relative to the anvil, the force resultant being primarily in a rotational direction so that practically all of the hammering energy is usefully expended further to rotate the anvil. The audible concussion incident to the hammering blows indicates that the nut has been set and the operator may halt the motor and remove the tool.

In a device embodying the diagonal keyways 46, it will be readily apparent that as the difference in torque between the power and tool members develops incident to a stall, increasing the pressure between the clutch teeth and causing the spring 34 to yield, the clutch element 30 will move away from the element 29 and relative to the sleeve 19 in a direction defined by the keyways 46, during which movement the speed of rotation of the clutch element is less than that of the sleeve. The spiral path is preferably in a direction substantially along the line of the resultant of the driving and the resilient spring forces upon the movable element 30 and assists in the separation of the clutch teeth. Thus, friction between the clutch teeth is minimized and the movement out of driving engagement is smoothly and uniformly effected. The return movement of the movable clutch element or hammer 30 is effected by the force accumulated in the spring 34 during compression thereof and this movement is directed by the keys and keyways along the same resultant line. The movable element is, therefore, guided into proper reengagement and during this movement the rotational speed of the movable element is faster than the speed of rotation derived directly from the driving motor through the sleeve 19, thereby substantially increasing the force of the hammering blows over the force which is obtainable by direct drive from the motor.

Where straight longitudinal keys are employed as in the form of Figs. 7 and 8, hammering blows will be delivered by the teeth 33 against stationary clutch element 29 and the teeth 32 but with less rotational force than that developed where diagonal keyways are used. Moreover, since the clutch element 30 can only move perpendicularly away from the clutch element 29, greater friction will develop between the complementary beveled side faces of the teeth when stall torque is developed. In order to facilitate the cam action between the teeth, therefore, these beveled teeth faces may be formed at a more acute angle than in the case of the structure embodying the angular keyways; for example, 30% as compared with 25% for the teeth faces as seen in Figs. 2 and 3.

Under certain circumstances it may be desirable to have the clutch arranged to develop a particular number of hammering blows during each revolution while the tool unit is stationary. To this end the arrangement of teeth may be such as best seen in Fig. 5, for example, wherein each clutch element has three equally spaced similar teeth so that hammering blows will be delivered three times during each revolution. Where a smaller number of hammering blows per revolution is desired, an arrangement such as seen in Fig. 10 may be employed. Here the segments comprising teeth 33 are of substantially greater length than intermediate teeth 33ª, and the teeth 32 comprise two opposite pairs so arranged that upon slipping of the teeth 33 thereover, the latter will be held out of driving engagement during about one-half of a revolution of the clutch element 30. This arrangement has been found particularly advantageous when applied to a device embodying straight longitudinal guides since the reduced number of driving contacts between the teeth minimizes the friction developed in the camming action of the teeth side faces.

From the foregoing, it will be apparent that the invention provides a durable power driving tool which is adapted for uniform, smooth, and positive action, and which embodies a simple, efficient arrangement of parts adapting the same for operation without straining or fatiguing the operator. The operator merely applies the tool to the work without more effort than is required to hold it in position, and upon activation of the motor the normally coupled power and tool units are jointly driven similarly as in a tool having a solid spindle. However, the coupling between the units is so arranged that when the threaded element has been set with predetermined force the tool unit develops a stall torque of given value which is effective to release the coupling and leave the tool unit substantially stationary while the power unit continues rotating. This action is smoothly and uniformly effected without jerking or vibration and the driven portion of the coupling is constructed to deliver a series of direct hammering blows with piston-like action against the stationary tool unit, the force of these blows being transmitted to the threaded element for thoroughly tightening the same. Through the construction and arrangement of the spirally acting movable clutch element structure, friction between contacting parts is reduced to a minimum and the efficiency and power output of the tool are increased. Moreover, the device is adjustable to suit varying conditions in use so that a threaded element may be driven and tightened properly without strain or damage.

I claim as my invention:

1. In a device of the character described, the combination of power and tool members, said power member including a sleeve and said tool member including a spindle rotatable within said sleeve, a clutch for maintaining said tool member against rotation relative to said power member and including a pair of clutch elements one of which is fixed relative to said spindle and the second of which is slidably mounted on said sleeve, yieldable resilient means for maintaining said clutch elements in driving engagement, diagonal keyways in said sleeve, and keys cooperatively arranged with said second element for engaging said keyways for normally maintaining said element against rotative movement relative to said sleeve but permitting spiral movement of said second element relative to said sleeve against the yielding force of said resilient means, said keyways being at an angle calculated to cause said second element to be forced by said resilient means against said first element substantially in the direction of rotation of said first element.

2. In a device for driving threaded subjects, a power unit including a rotary member, work engaging means comprising a tool unit including a part connected with said rotary member and adapted for independent rotary movement relative to said member, means providing a coupling between said rotary member and part for effecting joint rotation thereof and including opposed elements one of which is secured fast on said tool unit and the second of which is movably carried by said power unit, means for yieldingly maintaining said elements in opposed relation, complementary teeth on the opposed surfaces of said elements including abutting angular contact faces adapted to cam and permit relative slippage of the elements upon the development of a predetermined difference in torque therebetween, said power means being arranged to carry said second element continuously forward during operation whereby the forward contact faces of the teeth of said second element are adapted during slippage to strike the trailing contact faces of the teeth of said one clutch element for transmitting hammer blows to said tool unit in the direction of rotation to act upon the subject, said power unit including a part within said second element having a plurality of outwardly opening diagonally cam-walled recesses, and keys carried by said second element extending into said recesses for causing the latter element to follow the rotary movements of said power unit and coacting with the cam walls of the recesses during said slippage action for accelerating movement of said second element in the direction of rotation toward reengagement with said first element to increase the effect of said hammer blows.

3. In a device of the character described, the combination of power and tool members, said power member including a sleeve and said tool member including a spindle rotatable within said sleeve, a clutch for normally holding said tool member against rotation relative to said power member and including a pair of clutch elements one of which is fixed relative to said spindle and a second of which is slidably mounted on said sleeve, said clutch elements being coactive for joint rotary movement in one operative condition and being separable for independent relative movement in another operative condition, resilient means bearing against said second clutch element to urge the same yieldably toward said first clutch element, said second clutch element having a groove adjacent its contact face and said sleeve having a laterally projecting part engageable in said groove for limiting approaching movement of said second element in a direction toward said first element under the influence of said resilient means, a plurality of outwardly opening diagonally walled recesses circumferentially alined in said sleeve spaced from said projecting part, and follower keys projecting inwardly from said second clutch element into said recesses to key the latter element for joint rotation with said spindle and coacting with the diagonal walls of the recesses to guide said second element spirally about the sleeve as an incident to relative movement of said first and second clutch elements.

4. In a powered driving tool of the character described, the combination of driving means and driven tool carrying means having clutch mechanism including opposed driving and driven clutch elements connecting the same for joint rotary movement during a driving operation, said driving element being of ring shape slidably embracing a part of said driving means and having yieldable means bearing thereagainst to force the same constantly toward the driven clutch element, clutch teeth on the opposed portions of said elements having beveled cam faces coactive upon the development of predetermined torque in the tool to move upon one another to force said driving element axially out of clutching engagement with said driven element in opposition to said yieldable means for releasing driving force from said tool carrying means, said part of said driving means having a plurality of cam faces disposed upon an acute angle relative to the direction of rotation of the tool, a plurality of radial bores in said driving element, key pins loosely disposed within said bores and having complemental surfaces at their inner ends engaging said cam surfaces coactive to permit said part to rotate slightly ahead in the relative axial movement of said driving element and said part and in the return movement of said driving element guiding the latter sharply into concussive engagement with said driven element, and means for retaining said key pins removably within said bores.

5. In a tool of the character described, the combination of a rotary motor, a rotatable member, driving clutch means between said motor and member capable of release to enable relative rotation therebetween, compression means for automatically effecting the re-engagement of said clutch means, and cam means co-operating with said compression means for imparting additional rotative power to said member upon the re-engagement aforesaid.

6. In a tool of the character described, the combination of rotary driving means, a rotatable member, driving clutch means between said rotary driving means and said member capable of release to enable relative rotation therebetween, compression means for automatically effecting the re-engagement of said clutch means after the driving relationship of the clutch means has been released, and cam means separate from and cooperating with said clutch means for effecting a relative releasing movement of said clutch means upon the imposition of a predetermined resistance to rotary movement on said rotatable member, said cam means cooperating with said compression means for imparting additional rotative power to said member upon the reengagement aforesaid.

7. In a tool of the character described, the combination of a rotary spindle, a rotatable tool support, complementary driving clutch sections between said spindle and tool support capable of release to enable relative rotation therebetween, compression means for automatically effecting the reengagement of said clutch sections after the driving relationship thereof has been released, and cam means interposed between said spindle and an associated clutch section as a driving connection therebetween normally maintained in relatively fixed engagement by said compression means, said cam means cooperating with said associated clutch section to separate the clutch sections when said tool support encounters a predetermined resistance to rotation, and said cam means cooperating with said compression means for imparting the force of said compression means as additional rotative power to said associated clutch section to be expended on said tool support as a rotative power stroke upon reengagement of the clutch sections.

8. In a tool of the character described, the combination of a power driven rotatable member, a clutch member mounted on said driven member for relative rotational and axial movement, a rotatably mounted element to be driven including a complemental clutch member disposed for operative engagement by the first mentioned clutch member, both clutch members having interengaging surfaces extending across the rotary path of movement to provide a positive engagement for transmitting rotary motion from the first mentioned clutch member to said complemental clutch member, means for limiting the extent of movement of said first mentioned clutch member relative to said rotatable member in the direction of said complemental clutch member, means for urging said first mentioned clutch member toward the limiting means, and a driving connection between said driven rotatable member and the clutch member mounted thereon including an interconnecting cam and cam follower, the driving connection being normally maintained by the urging means to hold the engaging surfaces of said clutch members in operative contact, the slope of the cam being a spiral angle effective when a predetermined resistance to rotary movement is imposed on the complemental clutch to retract the first mentioned clutch member against the force of said urging means and interrupt the normal driving connection, the cam being effective after such interruption to translate the energy of the urging means into rotary movement of said first mentioned clutch member in amplification of the rotary motion imparted thereto by said power driven rotatable member.

9. In a rotary driving tool of the character described, the combination of a rotary driving member including a drive shaft, a rotatable member to be driven having clutch means thereon, complemental driving clutch means opposed to the first mentioned clutch means and movable axially into and out of engagement with said first mentioned clutch means, said clutch means being interengaged for the transmission of rotary power under normal running conditions, means for effecting intermittent disengagement and reengagement of said clutch means by axial movement of said driving clutch means when a predetermined excess resistance to rotation is imposed by said rotatable member, and means for effecting reengagement between said clutch means with a greater rotary force than that transmitted therebetween during rotation under normal running conditions, including a pin and slot driving connection between the driving clutch means and the drive shaft arranged to permit of relative movement of the connected parts.

ERNEST H. SHAFF.